(12) United States Patent
Crooks et al.

(10) Patent No.: US 7,991,716 B2
(45) Date of Patent: ＊Aug. 2, 2011

(54) COMPREHENSIVE IDENTITY PROTECTION SYSTEM

(75) Inventors: Theodore J. Crooks, San Diego, CA (US); Uwe F. Mayer, Encinitas, CA (US); Michael A. Lazarus, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,478

(22) Filed: Dec. 6, 2010

(65) Prior Publication Data

US 2011/0137840 A1    Jun. 9, 2011

Related U.S. Application Data

(63) Continuation of application No. 11/421,896, filed on Jun. 2, 2006, now Pat. No. 7,849,029.

(60) Provisional application No. 60/687,008, filed on Jun. 2, 2005.

(51) Int. Cl.
*G06E 1/00* (2006.01)
*G06E 3/00* (2006.01)
*G06F 15/18* (2006.01)
*G06G 7/00* (2006.01)

(52) U.S. Cl. ............................. 706/20; 706/16; 706/25

(58) Field of Classification Search .................... 706/16, 706/20, 25; 705/26, 35, 38, 44, 318, 325; 714/47
See application file for complete search history.

(56) References Cited

U.S. PATENT DOCUMENTS

| | | | | |
|---|---|---|---|---|
| 5,822,741 A | * | 10/1998 | Fischthal | 706/16 |
| 2002/0087460 A1 | * | 7/2002 | Hornung | 705/38 |
| 2002/0133721 A1 | * | 9/2002 | Adjaoute | 713/201 |
| 2006/0178971 A1 | * | 8/2006 | Owen et al. | 705/35 |
| 2006/0271456 A1 | * | 11/2006 | Romain et al. | 705/35 |

\* cited by examiner

*Primary Examiner* — Jeffrey A Gaffin
*Assistant Examiner* — Benjamin Buss
(74) *Attorney, Agent, or Firm* — Mintz, Levin, Cohn, Ferris, Glovsky and Popeo, P.C.

(57) ABSTRACT

A system and method for protecting identity fraud are disclosed. A system includes a detection subsystem to identify applications and/or accounts at risk of identity fraud, and a disposition subsystem to process data provided by the detection system and to determine whether identity fraud exists in the applications and/or accounts. According to an implementation, one or more neural network models are defined, each neural network model being configured to handle a class of cases related to the subject and a specific data configuration describing a case of the class. The one or more neural network models are run to generate data requests about the subject's identity, and the data requests are passed to a detection system that monitor transactions associated with the subject. Additional data associated with the transactions is requested until a threshold certainty is achieved or until available data or models are exhausted.

10 Claims, 10 Drawing Sheets

COMPREHENSIVE IDENTITY PROTECTION SYSTEM

CROSS REFERENCE TO RELATED APPLICATIONS

This application is a continuation and claims the benefit of priority under 35 U.S.C. §120 of U.S. patent application Ser. No. 11/421,896, filed Jun. 2, 2006 now U.S. Pat. No. 7,849,029, entitled "Comprehensive Identity Protection System", which claims priority under 35 U.S.C. §119 to U.S. Provisional Application Ser. No. 60/687,008, filed Jun. 2, 2005, entitled "Comprehensive Identity Protection System", which the disclosure of which is incorporated herein by reference.

BACKGROUND

Identity theft and fraud are two main challenges facing the credit industry. To counter these challenges, credit issuers rely on information about their customers. The information informs about a customer's identity, financial status and creditworthiness. For some customers, the amount of information necessary to get a reliable "picture" is considerable. However, the cost of obtaining this information can also be great.

SUMMARY

In general, this document discusses a system and method that provides protection from identity fraud for credit card issuers, credit-granting retailers, telecommunications carriers, full service banks, other credit grantors and their customers.

According to one aspect, a system and method are embodied in a Comprehensive Identity Protection System (CIPS). In some embodiments, a CIPS includes a detection subsystem to identify applications and/or accounts at risk of identity fraud, and a disposition subsystem to process data provided by the detection system and to determine whether identity fraud exists in the applications and/or accounts.

In one implementation, a method for protecting a subject's identity is disclosed. The method includes the step of defining one or more neural network models, each neural network model being configured to handle a class of cases related to the subject and a specific data configuration describing a case of the class. The method further includes the steps of running the one or more neural network models to generate data requests about the subject's identity, and passing the data requests to a detection system that monitor transactions associated with the subject.

In another implementation, a computer-implemented method to identify fraud in transactions on one or more systems used by a subject is disclosed. The method includes the modules or steps for running one or more neural network models from a set of neural network models to request data associated with the transactions, and requesting additional data associated with the transactions until a threshold certainty is achieved or until available data or models are exhausted.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a Comprehensive Identity Protection System (CIPS) that provides protection from identity fraud for credit card issuers, credit-granting retailers, telecommunications carriers, full service banks, other credit grantors and their customers.

CIPS is a multi-point system, and can be deployed in phases and span many client installations with central coordination and resources provided by a single identity clearinghouse. For instance, in some embodiments, a CIPS includes one identity clearinghouse that serves a national area comprising one or more nations. Alternatively, other national areas have different identity clearinghouses. Each client system may comprise a detection subsystem and a disposition subsystem. The detection subsystem identifies applications or accounts at undue risk of identity fraud. The disposition subsystem efficiently investigates risky applications or accounts to determine those that are genuine and those that are not.

Figure 1:
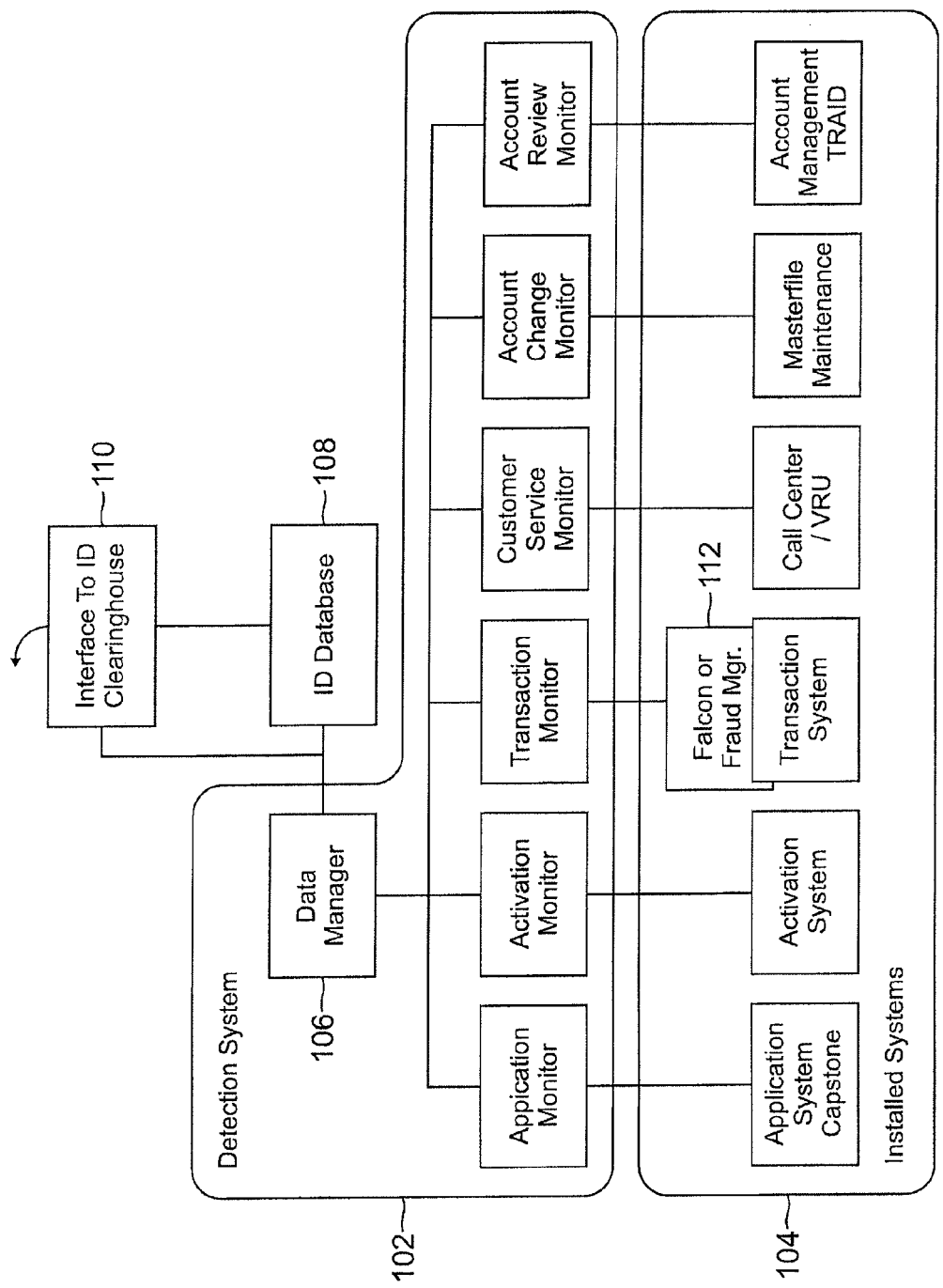
FIG. 1 illustrates a detection subsystem in accordance with an exemplary embodiment, and illustrating an installation for a credit card issuer.

FIG. 1 illustrates a detection subsystem 100 as part of a neural network in accordance with an exemplary embodiment. The detection subsystem 100 shown in FIG. 1 illustrates a neural network installation for a credit card issuer. The detection subsystem 100 includes one or more monitors 102 to assess the risk of identity fraud on installed systems 104 such as subject applications, transactions or accounts at a particular point in an account lifecycle. The monitors 102 include neural network models managed by a dynamic data manager 106, and that assess account or application characteristics for likelihood of identity fraud. Data from the monitors 102 is stored in an identity database 108. The detection subsystem 100 further includes an interface to an identity clearinghouse 110, which is connected to both the identity database 108 and data manager 106, and a fraud manager 112, which is preferably embedded with the installed systems 104.

Figure 2:
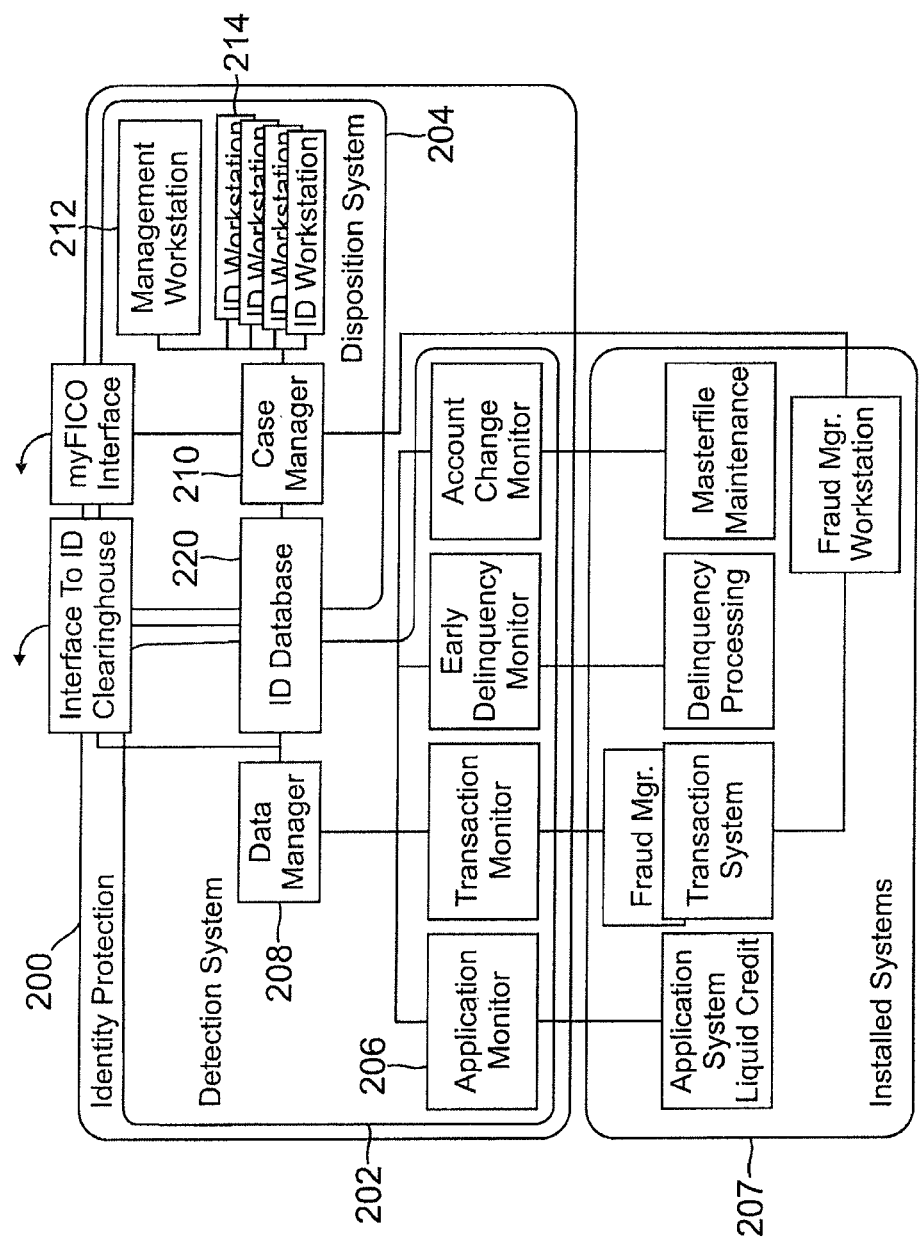
FIG. 2 illustrates a detection subsystem installation configured for a telecom carrier.

It should be understood that the detection subsystem can have various embodiments, each tailored for a specific implementation or user. For example, FIG. 2 illustrates a client system installation 200 configured for a telecom carrier. The client system installation 200 includes a detection system 202 and a disposition system 204. The detection system 202 includes a number of monitors 206 configured to monitor data and activity of a number of associated installed systems 207 such as applications, transaction systems, processing systems, maintenance systems and workstations. The monitors 206 are controlled by a data manager 208 that processes data from the monitors 206 to assess the likelihood of fraud being conducted within the installed systems 207.

The disposition system 204 includes a case manager 210, a management workstation 212, and one or more identity workstations 214 that are employed to investigate risky applications or accounts identified by the detection system 202 to determine those applications, accounts or transactions that are genuine and those that are not. The client system installation 200 includes an identity database 220, which can be a distributed database and shared among the detection system 202 and the disposition system 204, and one or more interfaces 222 to one or more identity clearinghouses, credit management systems, credit reporting bureaus, or database management systems.

Dynamic Data Optimization

Each monitor 102, 206 provides one or more neural networks, each of which are designed to handle a specific class of cases and a specific data configuration describing a case of that class. The dynamic detection manager runs these neural network models and, as appropriate, orders additional data about the subject identity from external data sources. These data requests are passed to a data manager module that serves all monitors in an installation and communicates with the remote identity clearinghouse to provide the requested data.

Figure 3:
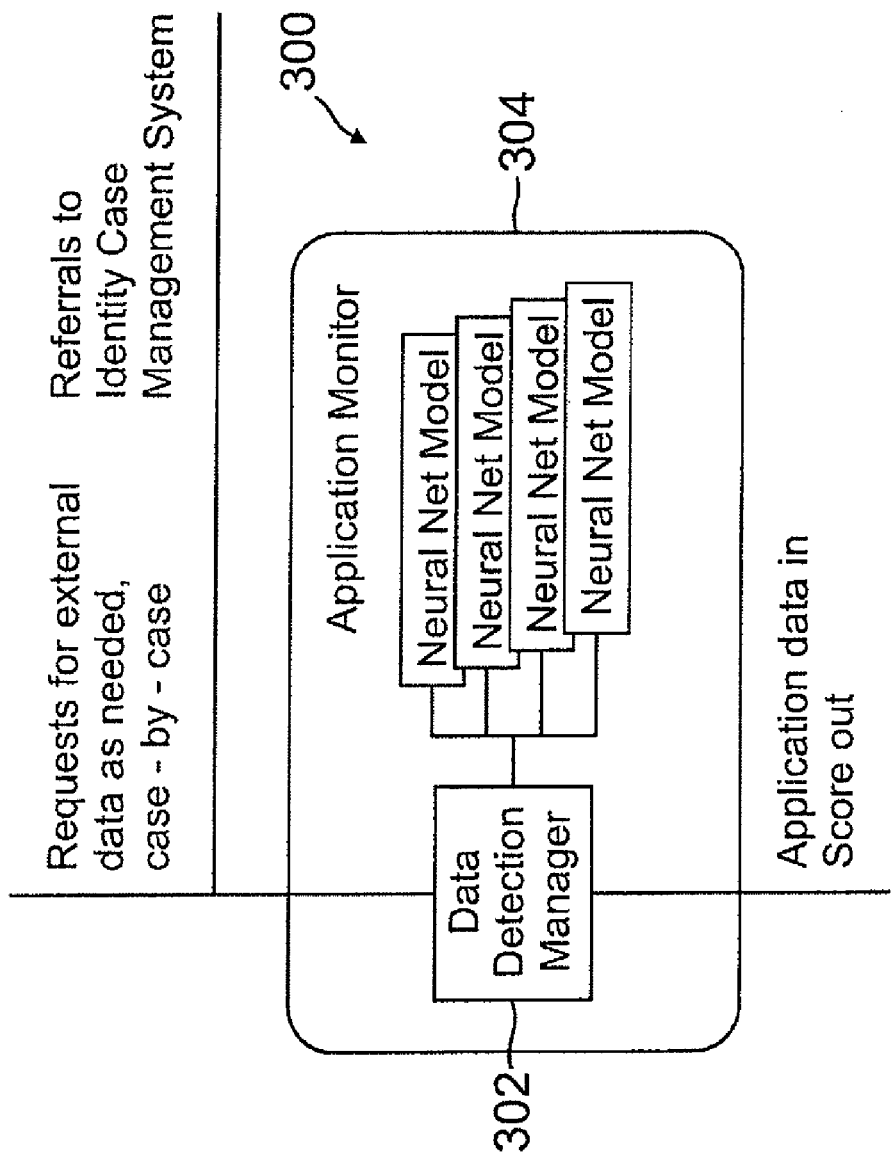
FIG. 3 illustrates internal structures of a detection system monitor including the dynamic detection manager.

FIG. 3 illustrates internal structures of a detection system monitor 300 including a dynamic detection manager 302 and one or more neural network models 304 that each define a neural network. The dynamic detection manager 302 repeats the cycle of running a neural network model 304, requesting additional data and running another model until sufficient certainty is achieved or available data or models are exhausted. This process is called dynamic data optimization. It ensures that cases requiring additional data and analysis get it while avoiding the cost of data and additional processing on most cases. In many cases, however, additional data is not required. One additional cycle is required for some cases and two or more cycles are required for the small percentage of cases representing a substantial portion of overall risk.

Each monitor 102, 206 reports a score representing the risk of identity fraud on a subject application or account. This score may be used by the installed system being monitored. It is also stored in a site-specific identity database. All prior results of monitoring activity are available in the identity database 108, 220 and may be accessed via the data manager 106, 208, and used by any monitor 102, 206. Some monitors 102, 206 are normally configured to store additional information in the identity database for subsequent use by the same or other monitors. Any active monitor 102, 206 may refer an application or account to the disposition subsystem, if one is installed, for further investigation and disposition.

Figure 4:
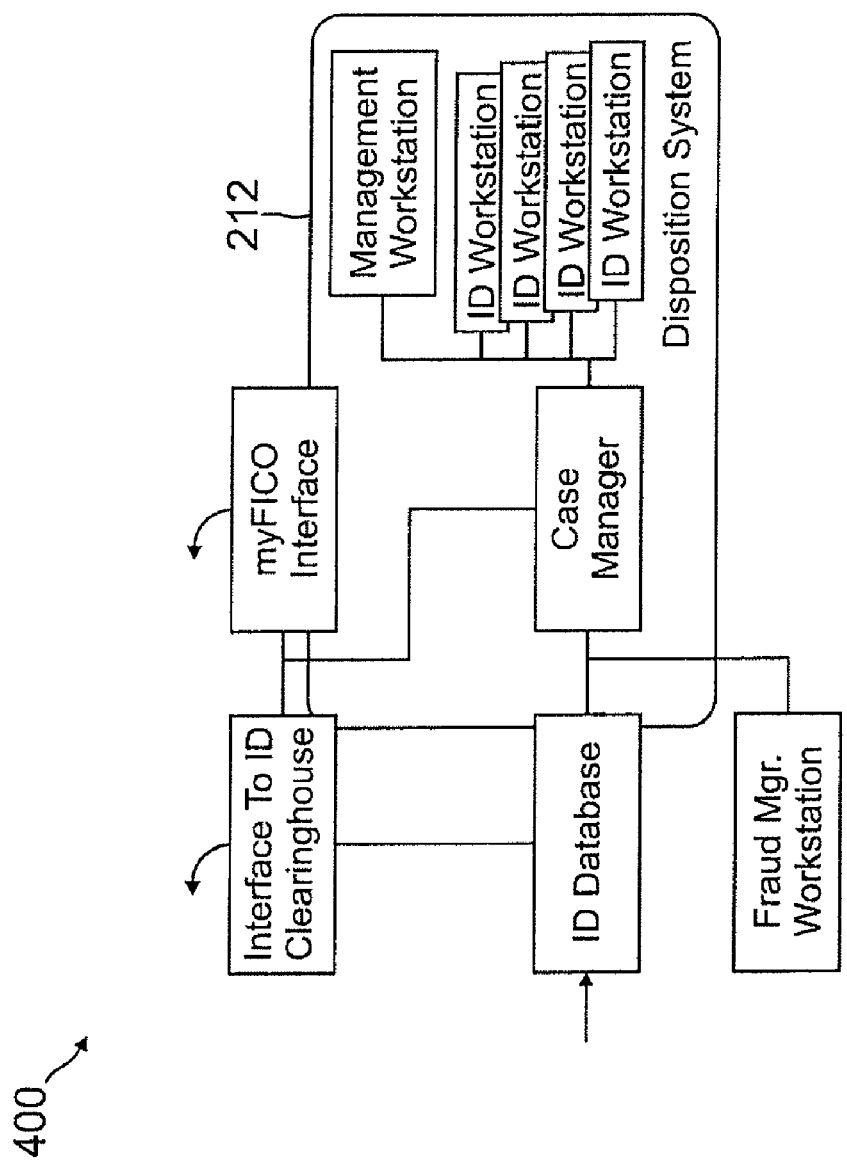
FIG. 4 illustrates the disposition subsystem in accordance with an embodiment for a implementation using a management workstation.

With reference now to FIG. 4, in accordance with an embodiment for an implementation, a disposition subsystem 400 uses a management workstation 402. The disposition subsystem 400 provides an efficient mechanism to further research applications and accounts that were found unduly risky by the fully automated detection subsystem. By resolving suspicions, the disposition system makes possible the booking and retention of many accounts that may appear risky, but upon investigation prove genuine.

Generally, cases are entered into a case management system by referral from monitors in the detection subsystem, but may be inserted by client-specific processes accessing an application program interface (API) provided for this purpose. Each case regards one and only one identity but may relate to more than one account or application associated with that identity. An identity may be the identity of an individual or a household. Generally where identity information is stored or processed by the CIP system it may be information about individuals or households. Upon creation, cases are assigned to a work queue according to rules established by client staff. The work queue prioritizes cases according to client-specified rules and presents them to analysts operating identity workstations. In some embodiments, identity workstations are PCs running a browser-based program served by the identity clearinghouse and accessing the client-specific identity database.

Figure 5:
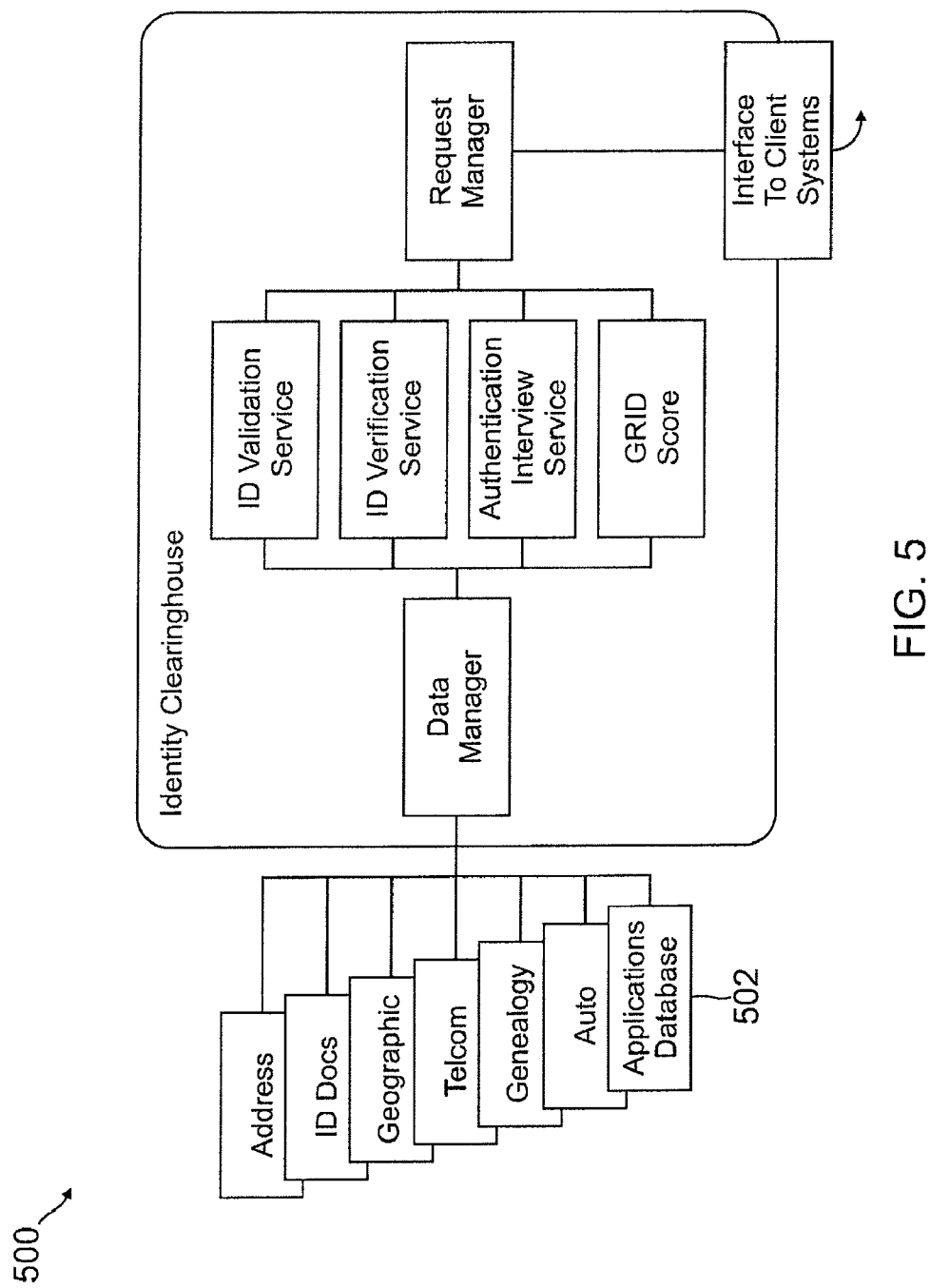
FIG. 5 illustrates an identity clearinghouse.

Once a case appears at an identity workstation, the usual practice is for the analyst to access account or application information helpful to a resolution of identity issues. Also, the analyst will typically access one or more services provided by the identity clearinghouse, including identity validation (checks of identity document validity, consistency and sufficiency), identity verification (checks of personal information from multiple, external databases and comparison with information provided by the customer) and an authentication interview. An example of an identity clearinghouse 500 is provided in FIG. 5, illustrating a central server 502 providing data to monitors and services to ID workstations.

An authentication interview is a series of questions presented to the customer verbally (i.e. by telephone) or via a website. The customer's multiple-choice responses are evaluated through a neural network model that returns a score indicating the risk that the respondent is not genuine. Authentication interviews are conducted under the control of a central system that tracks repeated interviews and scores interview results using responses as well as information on the frequency and veracity of prior interviews. An authentication interview server within the identity clearinghouse also avoids re-use of questions and mixes questions from multiple data sources both to confound fraudsters and to identify what knowledge fraudsters do and do not have. For example, if an imposter can provide answers from a credit report, but cannot tell the brand of gas station near the genuine subject's house, or cannot retrieve the first name of the subject's niece, then one can infer not only fraud, but something about how the fraud was attempted.

After using available services to investigate a case, an analyst is called upon to decide a disposition for the case that may be temporary (retained in a work queue) or permanent. Disposition alternatives are often customized to client requirements but typically include, accept as genuine, reject with request for physical documentation and accept with limitations. Where the client installation includes a system identity extension, the system may be instructed to enforce certain account restrictions ordered by the analyst. Other common dispositions include to book the account with a risk-adjusted fee or rate and to require a deposit for services.

Client management may configure the assignment of work queues to case characteristics, adjust the priority of cases within queues, assign queues to specific analysts and collect a wide variety of statistics on case and analyst activity, outcomes and productivity. Such managerial tasks are performed through the management workstation that offers a special control interface.

The identity case management system is designed to operate with manager workstation and the fraud manager workstation systems and coordinate case management with them to prevent duplicative or interfering operations. Disposition subsystem activities and results are recorded in the identity database, and may be accessed by detection subsystem monitors or through subsequent cases involving the same identity in the disposition subsystem, thus preventing redundant work or unnecessary customer annoyances. Some facilities of the identity clearinghouse are intended for special circumstances, minimal systems integration and may be accessed without installation.

GRID Score Service

The GRID score provided from the identity clearinghouse is accessed remotely as an ASP4 service. Typically, a client system sends the Identity Clearinghouse an encrypted identity record containing name, address, social security number (if known), driver's license state and number (if known). The GRID score returned reflects the probability that an identity fraud is underway involving the identity described. The GRID score is not an authoritative determination, but an inexpensive, summary judgment about the identity based upon the validity of information supplied and verification of its similarity to information known about the subject identity from other sources. In some applications the reliability provided by the GRID score alone is adequate. It is often used in a variety of screening applications. Within application processing systems, it is sometimes used as a first-cut tool to determine which applications do not even warrant the cost of obtaining a credit report about the subject identity.

Configuration Alternatives

The CIPS is highly configurable. Both the modules employed, whether they are installed locally on client-operated or processor systems, may be customized for each installation. For many users of application processing systems, CIPS may appear to be part of the application processing system. Despite seamless interaction, CIPS is fully independent of other software except for special direct connections into the fraud manager for telecom implementations. This special, direct connection is required because these systems are capable of real-time decisions during a purchase transaction or call placement. The high speed necessary for real-time decisions requires a direct connection and a single pass through the controlling neural network model with both legacy transaction data and identity data from CIPS considered in one operation. For such a connection, an optional extension is available that provides for downloading identity profiles into the fraud manager before they are needed in preparation for transaction scoring.

CIPS may be installed as an entirely remote service arrangement (via an ASP), or may be installed to run on a client's systems at the client's site. Also, the detection subsystem may be remote while the disposition subsystem is installed at the client's site or vice versa. The identity clearinghouse is always remote and operated at its own data center.

In some embodiments, configuration planning can begin with a determination of which monitors to install in the detection subsystem. Some monitors do not apply in some situations. The monitors are not all of equal value. In most credit-granting situations, the application monitor is of greatest immediate value as measured in fraud loss reduction. Also, monitors are often synergistic. For example, combining information between an application monitor and a transaction monitor often provides significantly better protection and more accurate detection than either monitor taken alone or the two operated in series without interconnection through the identity database.

Monitors Available for Bankcard and Retail Card Issuers

In one example, for bankcard and retail card issuers the monitors may include:

Application Monitor—Assesses the identity fraud risk of applications for new accounts based on application content and circumstances, credit information when available and other validation and verification data as necessary.

Activation Monitor—Assesses the identity fraud risk of new accounts at the time of card activation using information from application, credit review and activation circumstances.

Transaction Monitor—Assesses the identity fraud risk of new and established accounts after processing a transaction authorization. (Used in Phase 1 or Phase 2 when ID Extension is not used.)

ID Extension—Accepts identity profile data from the identity clearinghouse and use this information within the main Falcon transaction model for real-time transaction review. Can be used in Phase 2 and later. When installed, obviates the need for a Transaction Monitor.

Customer Service Monitor—Assesses the identity fraud risk of accounts immediately after customer service interactions via automated voice interactions, contact with a customer service representative or website interaction.

Account Change Monitor—Assesses the identity fraud risk of accounts after a change to account contact or control information. Re-runs repeatedly after the change to determine if the change is propagated to other accounts at other installations.

Account Review Monitor—Used periodically on all accounts, usually in combination with a routine credit review. Intended as an efficient screen for accounts now showing unusual activity but at risk of fraud based on information from sources external to the client operation. Different from other monitors in that it relies upon application of the GRID identity risk score. Most valuable in Phase 2.

Figure 6A:
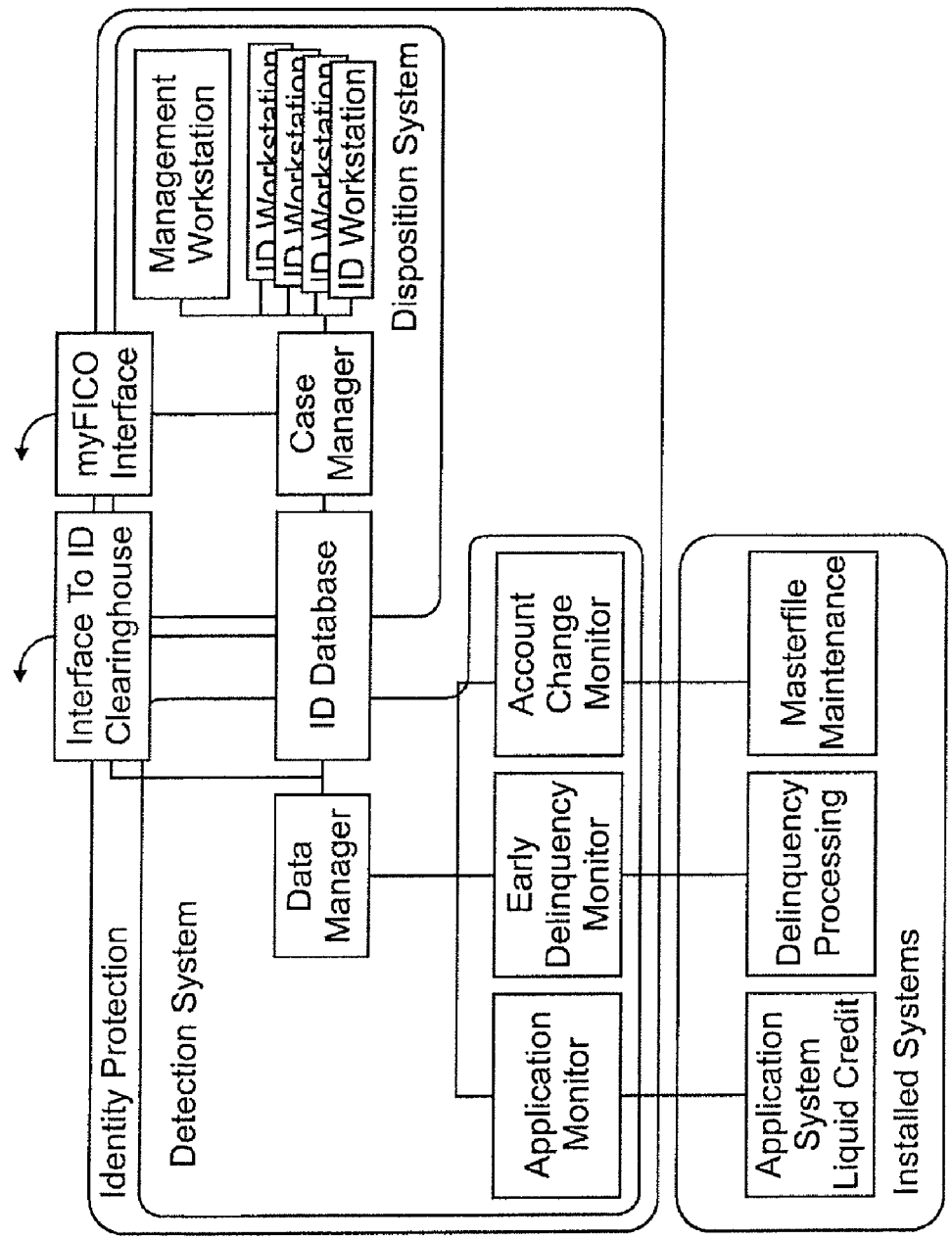
FIGS. 6A and 6B illustrate various examples of manager installations at a card issuer.
Figure 6B:
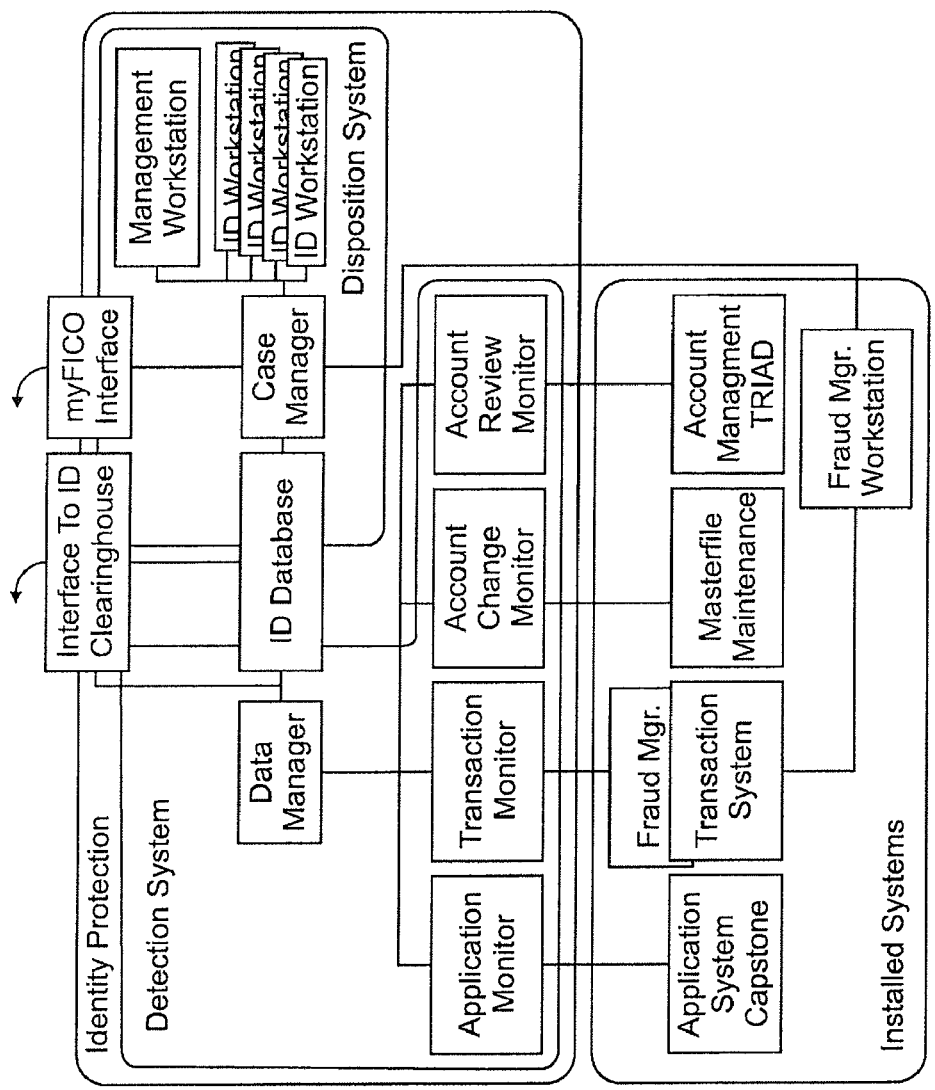

FIG. 6A illustrates one installation for a card issuer, while FIG. 6B illustrates an alternative installation for a card issuer.

Monitors Available for Telecommunications Carriers

Figure 7A:
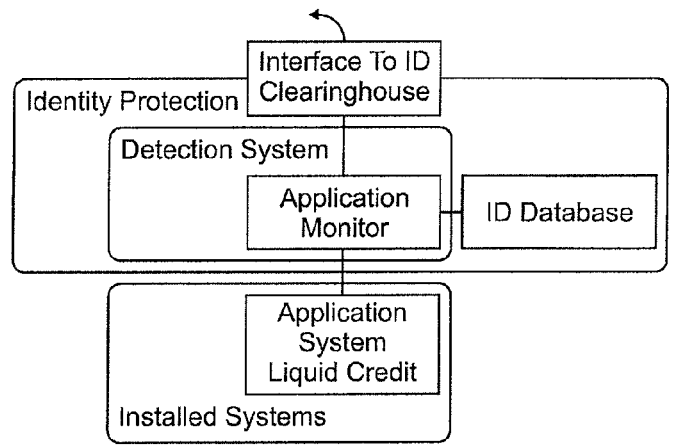
FIGS. 7A and 7B illustrates various examples of manager installations at a telecommunications carrier.
Figure 7B:
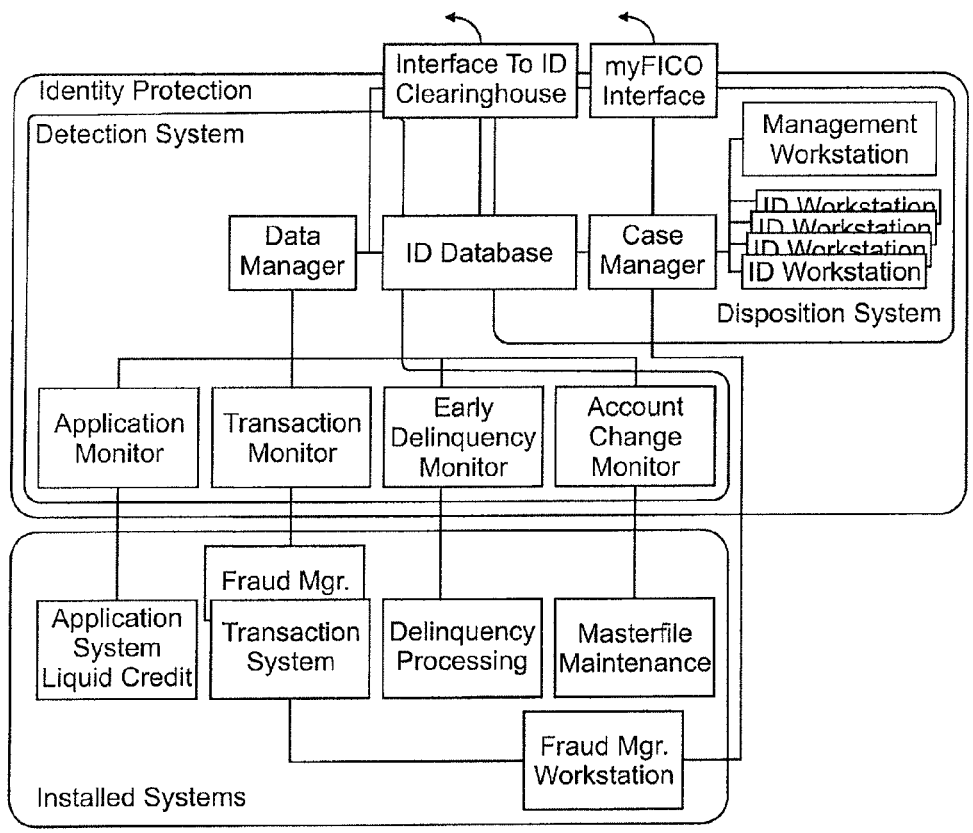

FIG. 7A illustrates a minimum detection installation for a telecommunications carrier. FIG. 7B illustrates a full installation of a telecommunications carrier. In accordance with various embodiments, the following monitors may be employed in a scalable manner:

Application Monitor—Assesses the identity fraud risk of applications for new accounts based on application content and circumstances, credit information when available and other validation and verification data as necessary.

Transaction Monitor—Assesses the identity fraud risk of new and established accounts after processing a transaction authorization. (Used in Phase 1 or Phase 2 when fraud manager ID extension is not used.)

Fraud Manager ID Extension—Modification of fraud manager for telecom system to accept identity profile data from the identity clearinghouse and use this information within the main Fraud Manager transaction model for real-time transaction review. (Used in Phase 2 and later. When installed, obviates the need for a Transaction Monitor.)

Early Delinquency Monitor—Assesses the identity fraud risk of accounts immediately after recognition of a delinquency.

Account Change Monitor—Assesses the identity fraud risk of accounts after a change to account contact or control information. Re-runs repeatedly after the change to determine if the change is propagated to other accounts at other installations.

Monitors Available for General Credit Grantors

The following monitors may be used for General Credit Grantors, in accordance with other embodiments:

Application Monitor—Assesses the identity fraud risk of applications for new accounts based on application content and circumstances, credit information when available and other validation and verification data as necessary.

Account Review Monitor—Used periodically on all accounts, usually in combination with a routine credit review.

Intended as an efficient screen for accounts now showing unusual activity but at risk of fraud based on information from sources external to the client operation. Different from other monitors in that it relies upon application of the GRID identity risk score. Most valuable in Phase 2.

Monitor Preparation and Consortium Data

The neural network models at the heart of each monitor are developed using a training algorithm capable of learning complex patterns and associating them with specific outcomes. In this application, the outcome is the presence or absence of identity fraud. Performance of such a system requires appropriate data from a representative source. The CIPS monitor models are normally trained with a combination of historical client-collected data and consortium data contributed by other clients. A mix of client-specific is optimum, because fraud characteristics unique to the client's situation are represented as well as frauds found elsewhere. This provides protection to new forms of fraud found at other clients, protects clients when attracting new kinds of business or dealing in new market segments and provides fraud examples on forms of fraud the client may be preventing yet not experiencing as actual fraud.

If client data is not available initially, models based on consortium data only can be used until sufficient client data is accumulated and top performance available. The CIPS system provides for collection of such historical data and adds it to the data consortium. Best quality historical data is available when the disposition subsystem is used as it provides a more accurate determination of suspect fraud records than can be obtained by rejections or requests for additional documentation.

Most, but not all client sites benefit from installation of the disposition subsystem, but it is not required. It is generally most valuable where the cost of new account acquisition is highest.

Disposition Subsystem Configurations

In some embodiments, a detection subsystem may be used without an associated disposition subsystem. But, to capitalize on the full value of a strong detection subsystem, a disposition subsystem is preferred. Likewise, for special situations, a disposition subsystem may be installed where there is no detection subsystem installed.

Figure 8:
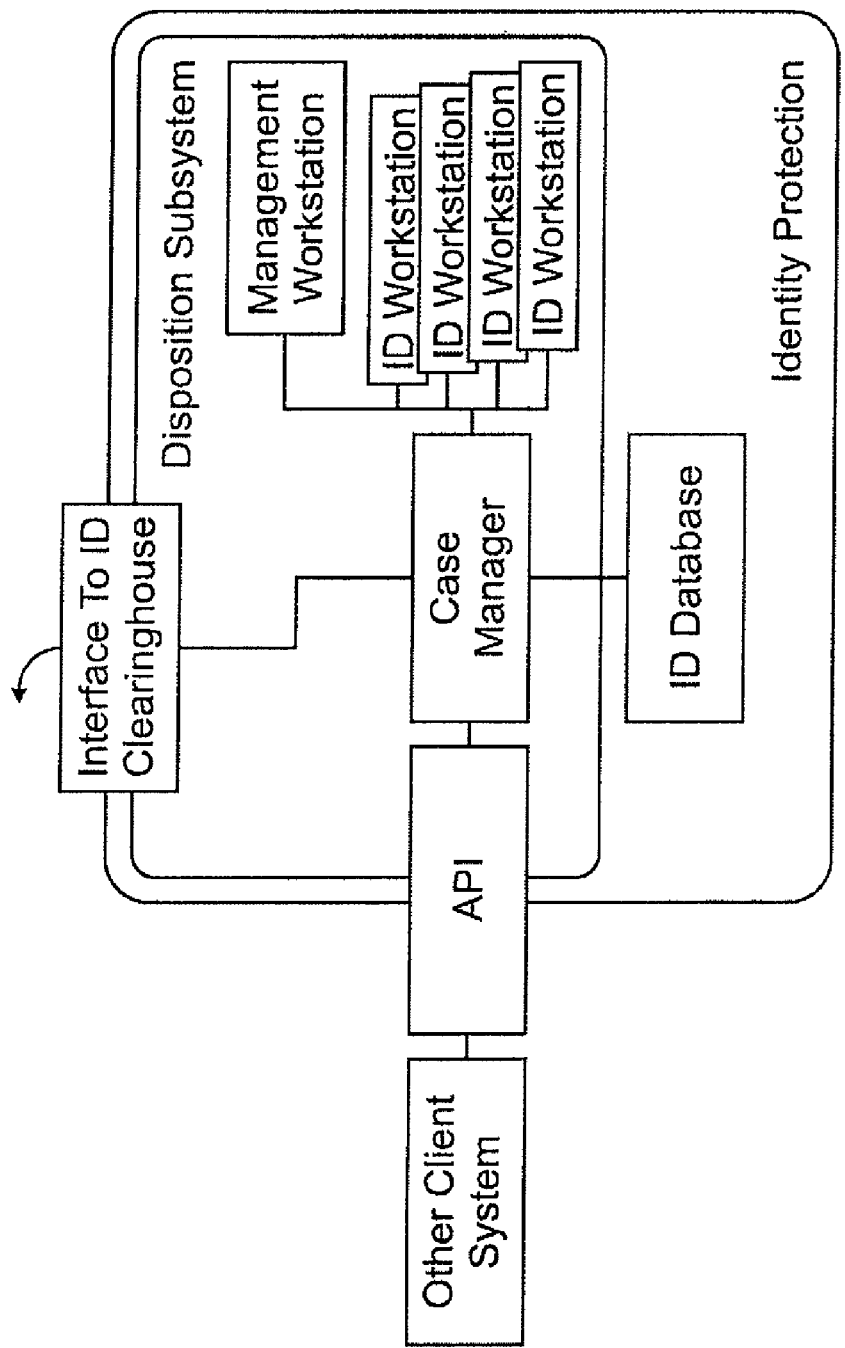
FIG. 8 illustrates a minimal disposition installation for a telecommunications carrier.

The disposition subsystem installation normally focuses on data from client systems to be displayed on the ID Workstation and connections to client systems that may create an investigation case through the provided interface. FIG. 8 illustrates a minimal disposition installation for a telecommunications carrier, as an example.

Figure 9:
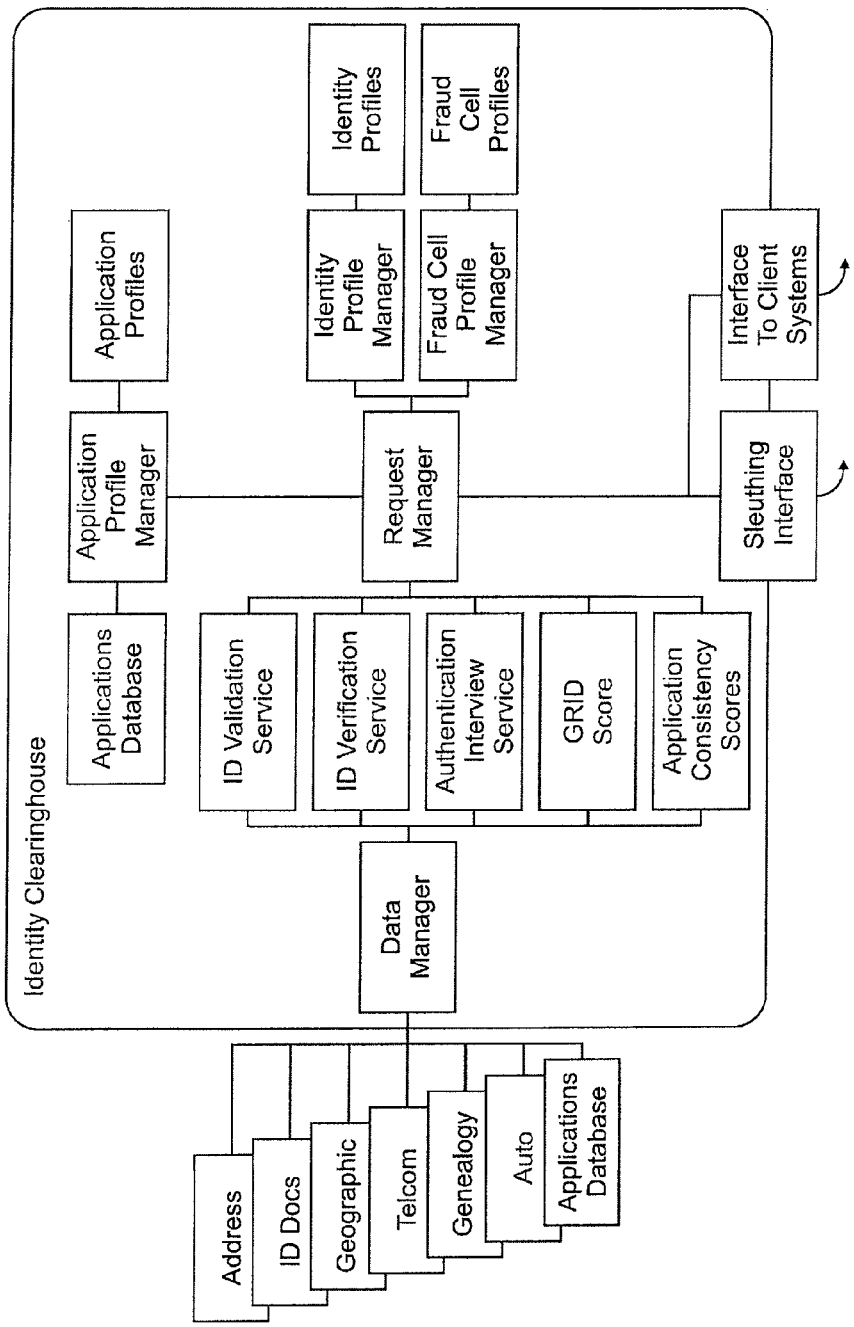
FIG. 9 illustrates an identity clearinghouse with profiling of shared application, identity behavior and fraud cells.

In some alternative embodiments, the CIPS operation involves sharing of information about common identities across all CIPS customers. These embodiments do not involve new components or changes in connectivity, but do involve functional expansion of the roles of several components. FIG. 9 illustrates an identity clearinghouse with profiling of shared application, identity behavior and fraud cells.

Within detection subsystems, monitors not only store results in the client-specific identity database, but also pass suspicious results to the identity clearinghouse. In turn, monitors receive alerts and identity-specific data from the identity clearinghouse; further extending the scope of dynamic data optimization. Also within disposition subsystems, case outcomes are summarized and exchanged with the identity clearinghouse, and identity clearinghouse data, in censored form, will be available to identity workstation analysts.

The extensive exchange of information with the identity clearinghouse is managed using a profile maintenance facility similar to that used in the fraud manager. This allows the accumulation and pre-processing of substantial information in a form directly accessible to models with monitors. There are two types of profiles maintained by the identity clearinghouse, which maintains identity profiles about individuals and households as seen across the CIPS network, and maintains fraud cell profiles about frauds discovered that are sufficiently similar in their specifics to be reasonably identified as the work of the same individuals or groups (called fraud cells) in CIPS.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data.

Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
   passing, from a data processing apparatus, data requests about the identity of a subject to a detection system to monitor transactions associated with the subject, the detection system comprising two or more monitors, each monitor comprising a set of two or more neural network models, each neural network model being trained with historical data related to the subject to profile an identity of the subject for a class of cases, each neural network model having a specific data configuration describing a case of the class each monitor monitoring transactions on a corresponding installed system on which a corresponding class of transactions occur, the monitoring comprising the each monitor sending a transaction score to the corresponding installed system, the transaction score representing the risk of the theft of the identity of the subject;
   identifying, by the detection system and according to at least one of the neural network models, a first set of transactions that are at risk of the theft of the identity of the subject; and
   determining, by a disposition system that is a part of the data processing apparatus, whether a particular transaction of the first set of identified transactions associated with the subject includes data indicative of a theft of the identity of the subject by a third person.

2. A method in accordance with claim 1, further comprising running the plurality of neural network models until the determining whether the particular transaction associated with the subject includes data indicative of a theft of the identity of the subject by a third person achieves a threshold level of certainty.

3. A method in accordance with claim 1, wherein the data requests are passed to a data manager module in the detection system.

4. A method in accordance with claim 1, wherein the gathered data in response to the data requests is processed by a disposition system.

5. A method in accordance with claim 1, further comprising storing processed data in an identity clearinghouse memory connected with the data processing apparatus.

6. A computer program product comprising a machine-readable medium storing instructions that, when executed by at least one programmable processor, cause the at least one programmable processor to perform operations comprising:
   receive data requests about the identity of a subject to monitor transactions associated with the subject, the at least one programmable processor comprising two or more monitors, each monitor comprising a set of two or more neural network models, each neural network model being trained with historical data related to the subject to profile an identity of the subject for a class of cases, each neural network model having a specific data configuration describing a case of the class each monitor monitoring transactions on a corresponding installed system on which a corresponding class of transactions occur, the monitoring comprising the each monitor sending a transaction score to the corresponding installed system, the transaction score representing the risk of the theft of the identity of the subject;

identify, according to at least one of the neural network models, a first set of transactions that are at risk of the theft of the identity of the subject; and determine whether a particular transaction of the first set of identified transactions associated with the subject includes data indicative of a theft of the identity of the subject by a third person.

7. A computer program product in accordance with claim 6, further comprising instructions that, when executed by the at least one programmable processor, cause the at least one programmable processor to run the plurality of neural network models until the determining whether the particular transaction associated with the subject includes data indicative of a theft of the identity of the subject by a third person achieves a threshold level of certainty.

8. A computer program product in accordance with claim 6, wherein the data requests are passed to a data manager module implemented by the at least one programmable processor.

9. A computer program product in accordance with claim 6, wherein the gathered data in response to the data requests is processed by a disposition system implemented by the at least one programmable processor.

10. A computer program product in accordance with claim 6, further comprising instructions that, when executed by the at least one programmable processor, cause the at least one programmable processor to store processed data in an identity clearinghouse memory connected with the at least one programmable processor.

* * * * *